United States Patent
Wunderlich

(10) Patent No.: US 10,293,823 B2
(45) Date of Patent: May 21, 2019

(54) METHOD FOR SELECTING AN EVALUATION OBJECT FOR A FUNCTION IN A MOTOR VEHICLE

(71) Applicant: AUDI AG, Ingolstadt (DE)

(72) Inventor: Matthias Wunderlich, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/748,512

(22) PCT Filed: Jul. 15, 2016

(86) PCT No.: PCT/EP2016/001234
§ 371 (c)(1),
(2) Date: Jan. 29, 2018

(87) PCT Pub. No.: WO2017/020992
PCT Pub. Date: Feb. 9, 2017

(65) Prior Publication Data
US 2018/0222479 A1 Aug. 9, 2018

(30) Foreign Application Priority Data

Aug. 1, 2015 (DE) .................... 10 2015 010 135

(51) Int. Cl.
*B60W 30/00* (2006.01)
*B60W 30/16* (2012.01)
(Continued)

(52) U.S. Cl.
CPC ......... *B60W 30/16* (2013.01); *B60K 31/0008* (2013.01); *B60K 35/00* (2013.01);
(Continued)

(58) Field of Classification Search
CPC .... B60W 30/16; B60W 30/162; B60W 50/08; B60W 50/14; B60K 31/0008
See application file for complete search history.

(56) References Cited

U.S. PATENT DOCUMENTS

| 7,209,822 B2 | 4/2007 | Linden |
| 9,605,971 B2 | 3/2017 | Niehsen et al. |

(Continued)

FOREIGN PATENT DOCUMENTS

| DE | 10343684 A1 | 4/2005 |
| DE | 102007052355 A1 | 5/2009 |

(Continued)

OTHER PUBLICATIONS

International Search Report and Written Opinion of the International Searching Authority directed to related International Patent Application No. PCT/EP2016/001234, dated Dec. 6, 2016, with attached English-language translation; 26 pages.

(Continued)

*Primary Examiner* — Anne M Antonucci
*Assistant Examiner* — Renee LaRose
(74) *Attorney, Agent, or Firm* — Sterne, Kessler, Goldstin & Fox, PLLC

(57) ABSTRACT

A method is provided for selecting, by a driver, a road user, the road user being an evaluation object of a function of a driver assistance system of a motor vehicle, using at least one display device which displays the road user. After a first operating action is carried out, a search function is activated in which at least a subset of the shown road users is individually marked on the display device in a sequence containing all road users. When a second operating action is carried out, or after a predetermined first period of time, the currently-marked road user is selected as the evaluation object for the function.

19 Claims, 2 Drawing Sheets

S1 = Execution of first operating action
S2 = Vehicle search is prepared
S3 = Mark first/next selectable further road user in the sequence
S4 = Verification (manual search) is made
S5 = Currently selected further road user is selected as the evaluation object

(51) Int. Cl.
    *B60W 50/08*     (2012.01)
    *B60K 31/00*     (2006.01)
    *B60K 35/00*     (2006.01)
    *B60W 50/14*     (2012.01)

(52) U.S. Cl.
    CPC ............ *B60W 50/08* (2013.01); *B60W 50/14* (2013.01); *B60K 2031/0016* (2013.01); *B60K 2350/1024* (2013.01); *B60K 2350/1072* (2013.01); *B60K 2350/2008* (2013.01); *B60K 2350/2052* (2013.01); *B60K 2350/352* (2013.01); *B60W 2050/146* (2013.01); *B60W 2520/10* (2013.01); *B60W 2550/10* (2013.01); *B60W 2550/30* (2013.01); *B60W 2550/408* (2013.01); *B60W 2750/30* (2013.01)

(56) References Cited

U.S. PATENT DOCUMENTS

2013/0231829 A1     9/2013     Gerdt
2016/0062614 A1     3/2016     Lou et al.

FOREIGN PATENT DOCUMENTS

| | | |
|---|---|---|
| DE | 102009046376 A1 | 5/2011 |
| DE | 102012210145 A1 | 12/2012 |
| DE | 102011122616 A1 | 6/2013 |
| DE | 102013215370 A1 | 2/2015 |
| WO | WO 2014177297 A1 | 11/2014 |

OTHER PUBLICATIONS

International Preliminary Report on Patentability directed to related International Patent Application No. PCT/EP2016/001234, dated Nov. 14, 2017, with attached English-language translation; 15 pages.
English-language abstract of German Patent Application Publication No. DE 102007052355 A1, published May 7, 2009; 1 page.
English-language abstract of German Patent Application Publication No. DE 102009046376 A1, published May 5, 2011; 1 page.
English-language abstract of German Patent Application Publication No. DE 102011122616 A1, published Jun. 27, 2013; 1 page.
English-language abstract of German Patent Application Publication No. DE 102013215370 A1, published Feb. 5, 2015; 2 pages.

METHOD FOR SELECTING AN EVALUATION OBJECT FOR A FUNCTION IN A MOTOR VEHICLE

TECHNICAL FIELD

The invention relates to a method for the selection, by a driver, of a further road user, the same serving as an evaluation object of a function of a driver assistance system of a motor vehicle, using at least one display device which shows the selectable further road user. In addition, the invention relates to a motor vehicle.

BACKGROUND

Modern motor vehicles offer extremely far-reaching possibilities for sensing the surrounding environment. In particular, sensor data picked up by environmental sensors, and/or communication data from an automobile-to-automobile communication can be used, for example, to establish an environment model which, inter alia, describes further road users as well as the ego-vehicle. This environment perception, which also allows a clear distinction between further road users, can be used to realize functions of driver assistance systems which aid the driver, and which relate to a particular evaluation object—to provide, for example, information about the same and/or to control the operation of the motor vehicle using the evaluation object.

An important group of such functions are longitudinal guidance functions which have an operating mode for following. So-called Adaptive Cruise Control (ACC) systems, in which a minimum distance or a minimum time gap to a preceding motor vehicle is regulated, are an example of this. The preceding vehicle, as the evaluation object, is a follow object in this case. However, in particular with the increasing availability of automatic driving functions in motor vehicles, extended following functions have been proposed, in which a motor vehicle can be followed with a lateral offset, and/or complete tracking of a further road user is possible—in particular including passing maneuvers and the like.

The problem in this case is that, in many systems available today, little or no influence on the selection of the evaluation object, in particular the follow object, is granted to the driver. In this regard, DE 10 2013 215 370 A1 has proposed an approach to interpreting gestures of the driver for selecting an object existing outside the motor vehicle, via gesture recognition in a head-up display (HUD). Head-up displays in motor vehicles usually use the windshield as a reaction surface, and thus display area, which of course also shows the further road users due to its transparency. Contact analog information relating to objects which are visible through the windshield can be represented by an accurate-position overlay. DE 10 2013 215 370 A1, mentioned above, proposes the display of a cursor as a feedback element, indicating how the driver's gesture commands are being interpreted. In particular, other vehicles can also be marked in the display, and can particularly also be selected as a follow-up object in the context of an ACC system.

However, it is disadvantageous that a complex interpretation of gestures of the driver, and an assignment to further road users visible through the windshield and displayed on the same, need to be undertaken, which in turn is not easy to implement. In addition, the marking by means of a cursor is an additional task which requires an increased concentration of the driver in addition to the act of driving itself.

BRIEF DESCRIPTION OF THE DRAWINGS/FIGURES

DETAILED DESCRIPTION

Figure 1:
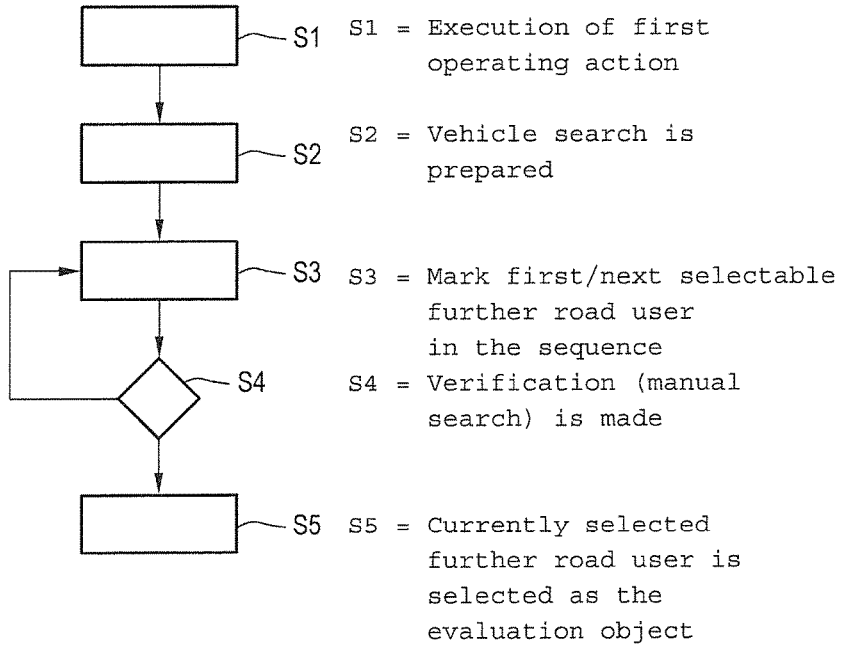
FIG. 1 illustrates an exemplary flow chart of a first embodiment of the method according to the invention.

The invention is therefore based on the object of providing an improved, more intuitive realization, by means of a display device, of a selection option which is less demanding of the driver's attention.

This problem is addressed according to the invention, in a method of the type noted above, in that, after a first operating action is carried out, a search function is activated, in which at least a subset of the shown further road users is individually marked on the display device in an order containing all selectable road users, and when a second operating action is carried out, or after a predetermined first period of time, the currently-marked further road user is selected as an evaluation object for the function.

According to the invention, the environment perception exploits the fact that it is already known—for example, from an environment model—which further road users are seen on the display device—for example, through the windshield of a head-up display, used as a projection surface—so that it is possible to present the driver, in a targeted manner, as a pre-selection, with further road users which he can select, without him needing to recognize further road users and select the most suitable from the same as part of a complex activity—for example based on controlling a cursor. The corresponding, subsequent assignment of the cursor to a further road user is also advantageously eliminated, since a certain, selectable, further road user is already selected once the selection is performed.

Thus, the procedure according to the invention, with a continuous selection option, corresponds to a type of vehicle search, wherein such searches—for example, in the case of a radio station search—are already known and intuitively understandable to the driver. The further road users, which can be seen and selected on the display surface, are then selected in turn one after the other, in order to provide a particularly simple, advantageous selection option which can be expediently expanded upon to achieve further advantages, as described in more detail in the following.

In this case, a distinction can be made between an automatic and a manual vehicle search. In the case of the manual vehicle search, after the start of the process by the first operating action, the first selectable, further road user is marked according to the sequence. If no further operating action occurs within the first time period, the currently marked further road user is considered selected. If, however, the driver decides, by performing a predetermined further operating action, which can particularly preferably correspond to the first operating action, within the first time period, to see selectable further road users, then the next selectable further road user in the sequence is automatically marked after the further operating action has been carried out, whereupon the procedure is repeated. In this way, by carrying out the further operating action, the driver himself can ultimately control the speed of the vehicle search, and does not have to carry out any special operating action for the selection—after which, at the end of the first time period, the selection as an evaluation object occurs automatically.

It is expedient in the automatic vehicle search that, if no second operating action is carried out within a second time period, the next selectable road user is automatically marked. The second time period can also correspond to the first time period. In this case, the marking ultimately always jumps from one selectable further road user to the next selectable road user in the sequence, and the driver must react, by performing the second operating action within the second time period, as soon as he wants to select one of the selectable further road users as the evaluation object.

It should be noted that, of course, a configuration can be contemplated in which the driver can select, by an appropriate operating input, whether he wants an automatic or a manual vehicle search.

In a particularly advantageous embodiment of the present invention, the first or the second time period is adapted according to at least one driving situation parameter describing the current driving situation. Specifically, for example, a value for the first or the second time period can be selected according to a current speed of the motor vehicle and/or a current driving situation class. The driving situation classes can include, for example, "congestion", "unobstructed highway travel", "unobstructed secondary highway travel", "city traffic" and the like. This configuration takes account of the fact that the driving situation can have an influence on how much time the driver can take, or wants to take, to select the evaluation object. For example, there is more time available in a traffic jam situation, since the further road users remain longer in the driver's field of vision, and thus the selection process can be slowed down. However, in the case of fast highway operation, decisions must be made faster—because, for example, selectable further road users can disappear from view, etc. Thus, it is proposed that the current driving situation is automatically detected and the speed of the vehicle search (road user search) is adjusted accordingly.

A particular advantage of the procedure according to the invention is that a pre-selection can be made automatically, and/or a selection aid can be given to the driver by varying the marking. Thus, in a particularly preferred embodiment of the method according to the invention, the selectable further road users are determined according to at least one requirement criterion evaluating at least one piece of road user information related to the respective further road user, from among the shown further road users, and/or the type of the marking is varied according to the or a further requirement criterion. In a simple example, on the basis of the road user class of a further road user, for example, the same is excluded—by way of example, in the event that the function is not to refer exclusively to trucks or passenger cars, but not to two-wheelers. The latter can then be excluded from the outset as a selectable further road user on the basis of a corresponding requirement criterion. However, more complex requirement criteria can also be contemplated, which are used to influence the selectability and/or the type of marking to assist the driver in the selection.

In this case, it is particularly preferred that at least one requirement criterion is used which describes suitability as an evaluation object for the function. Consequently, the function is specifically targeted for which the further road user shall be the evaluation object, such that the requirements thereof are met in any case. If the requirement criterion even quantifies the suitability as an evaluation object, which will be discussed in more detail in the following, appropriate marking adjustments can be made.

Of course, at least one requirement criterion can also be adapted by the user such that, for example, he can make his own requirement criteria in a configuration step and/or can parameterize existing requirement criteria. This enables an extensive customization—for example, if a user does not want to use certain vehicle makes which are recognizable in environmental data as evaluation objects, etc.

When a requirement criteria describes the suitability as an evaluation object for the function, it is expedient if the suitability relates to the metrological detectability of the further road user and/or the driving style thereof, and/or at least one requirement criterion which describes the suitability uses the results of a driving situation analysis. For example, further road users which are difficult to detect metrologically are frequently much worse as evaluation objects than those which, for example, produce a high signal-to-noise ratio in sensor data. Furthermore, a driving situation analysis, in particular with regard to driving style, can also give substantial indications of the suitability of a further road user as an evaluation object—by way of example, when a follow object will be selected as an evaluation object, and the further road user has an irregular or dangerous driving style.

In a further advantageous implementation in this regard, the road user information is at least partially determined from communication data of the automobile-to-automobile communication. Methods for establishing an automobile-to-automobile communication have already been proposed in large numbers in the prior art; automotive WLAN is also preferably used as the communication standard in the context of the present invention. The automobile-to-automobile communication allows information to be exchanged between automobiles, and can ultimately be thought of as a kind of further environment sensor which can provide more accurate data regarding various characteristics of further road users. In particular, information can also be obtained via the automobile-to-automobile communication which would otherwise not be detectable, but which may be important for the selection as an evaluation object.

Thus, in a particularly advantageous implementation of the present invention, as part of a follow function—that is, the selection of a follow object—as part of a requirement criterion evaluating a part of the road user information derived from communication data, a verification is made to see whether the next route segment, having a minimum length, is shared by, and/or whether a common destination exists for, the further road user and the motor vehicle.

If, for example, a current navigation destination, and/or a current navigation route, of the further road user are received via the automobile-to-automobile communication, it is possible to favor further road users in the selection, in particular during a follow mode of the driver assistance system, which will travel the same route segment at least for a minimum distance, or which even have the same destination entirely—which may also be an intermediate destination. Further road users which are entirely unsuitable in this respect can be excluded as selectable further road users, whereas for other further road users, the marking can be adapted accordingly to emphasize the particular suitability.

In general, the color and/or the geometric shape of a symbol which marks the selectable further road user can be varied to adapt the marking. By way of example, particularly suitable further road users which meet, for example, a large number of requirement criteria and/or certain requirement criteria, can be displayed in green; less suitable, selectable further road users can be displayed in yellow, and rather unsuitable further road users in red. The symbols can, for example, be selected in such a manner that the degree to which specific requirement criteria are met can be seen from the symbols. In addition, a continuous display of the suitability, for example in the form of a display bar which can be filled to different heights, can even be used.

Another means for advantageously adapting the marking is provided by the sequence of the same. As such, the sequence of the marking of the selectable further road users can be selected according to at least one requirement criterion. It is particularly preferred in this case that the most suitable evaluation objects are emphasized first.

In this context, in a preferred embodiment, a suitability value for the selectable further road user, the suitability value describing the degree of suitability as an evaluation object, is determined as part of at least one requirement criterion which verifies suitability as an evaluation object, and the suitability value can particularly be continuously depicted by a color and/or geometric shape of the symbol, and/or the sequence of the marking is determined based on the same—in particular by decreasing suitability value. In this way, it is not only possible, by a simple sorting process, to highlight the particularly suitable, selectable further road users first by marking; in addition, the marking can vary particularly continuously, such that a particularly accurate assessment of suitability by the driver, and therefore a particularly sound selection, is possible. As already described, it can be contemplated, for example, that a partial symbol of the marking symbol is used as a continuously applicable display element for the suitability value, and the like.

A particularly preferred embodiment of the invention also results if at least one requirement criterion is adapted according to a driving situation parameter describing the current driving situation—in particular, in such a way that the number of selectable further road users is reduced in a driving situation requiring increased driver attention. As has already been discussed with respect to the time adaptation, it is also possible to simplify and speed up the selection process in another way—for example, by adapting the selection options according to the actual current driving situation. If the current driving situation requires a particularly high level of driver attention, little attention can thus be diverted to the selection of the evaluation object. As such, the number of selectable further road users can be reduced by a corresponding tightening of the requirement criteria, and the like. For example, threshold values can be modified according to the result of a driving situation analysis. In particular, as is known in the prior art, it is possible to obtain general characteristics, for example criticality values, from a driving situation analysis, which can be used directly to adapt requirement criteria.

Of course, the approach described here can be used for a plurality of functions that are possible in a motor vehicle, for which an evaluation object is needed and a selection by the driver may be useful. Consequently, for example, one of a plurality of possible functions is selected according to a third operating action preceding the first operating action. For example, in a driver assistance system, there may be several different follow situations which use a different follow classification. Thus, for example, a first follow mode can be used by exactly copying the corresponding driving characteristics of the selected follow object—for example by using the same vehicle lane, the same speed, and the like, particularly including passing operations of the follow object. A second follow mode can be realized while maintaining the automobile's own driving style, such that, for example, a laterally or longitudinally offset follow behavior is realized. Such a follow function can be aborted, for example, if the second road user selected as the evaluation object (follow object) is too far away from the motor vehicle.

It has also proven to be advantageous if, after the selection of an evaluation object, it is further marked in a different manner in the display. For example, a color change of the marking can be made to a specific color which is assigned solely to the characterization of a selected evaluation object. In this way, the driver can continue to track the evaluation object in a simple manner, and optionally evaluate the function that utilizes it.

As already noted, it is preferred in the context of the present method that the display device to be used is a head-up display device which uses the windshield of the motor vehicle through which further road users can be seen. Head-up displays and possibilities for contact-analog representation of information regarding further road users are known. In the form of the transparent projection screen—in this case, the windshield—the head-up display then shows both the further road user and the information assigned to the same—in this case, the marking used, which facilitates the selection decision. Of course, it is also conceivable, however, to use other display devices, such as screens of a human-machine interface on which are displayed camera images showing the further road users, and/or, by way of example, abstract representations of road users derived from an environment model.

As has already been explained, the method according to the invention can be used particularly expediently if at least one follow function is used as the function, and the evaluation object is the follow object. Especially with regard to follow objects, it is often meaningful and/or desirable for drivers to be able to choose the corresponding evaluation object—in this case, the follow object—themselves.

A particularly advantageous type of marking can be realized via a crosshairs, which can serve as a symbol in the context already discussed above, for example. Crosshairs are intuitively associated with a target search, and thus contribute to the ease of understanding of the method according to the invention.

In addition to the method, the invention also relates to a motor vehicle, having at least one control device designed to carry out the method according to the invention, having the display device, and the driver assistance system. By way of example, the control device can be functionally assigned to the driver assistance system, although it is particularly preferably a control device of a so-called central driver assistance system, which brings together composite environment data, for example in the form of an environment model, and makes the functions available and/or even implements the functions of all driver assistance systems. All of the statements made relating to the method according to the invention can be analogously applied to the motor vehicle according to the invention, with which the advantages mentioned above can also accordingly be obtained.

It should be noted at this point once again that the evaluation of environment data, and optionally other data such as ego-data, for the purpose of determining road user information, driving situation parameters, and the like is already well known and discussed in the prior art. As such, this portion of the procedure according to the invention does not need to be specified in greater detail here.

Figure 2:
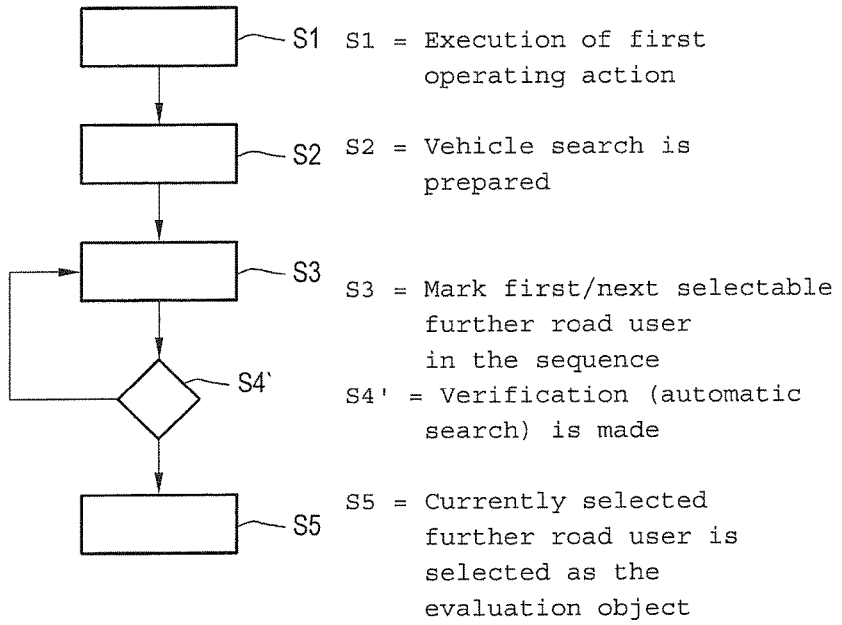
FIG. 2 illustrates an exemplary flowchart of a second embodiment of the method according to the invention.
Figure 3:
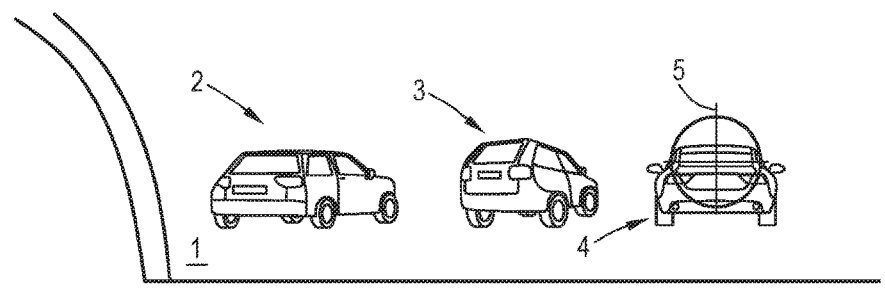
FIG. 3 illustrates a schematic representation for marking a selectable further road user.
Figure 4:
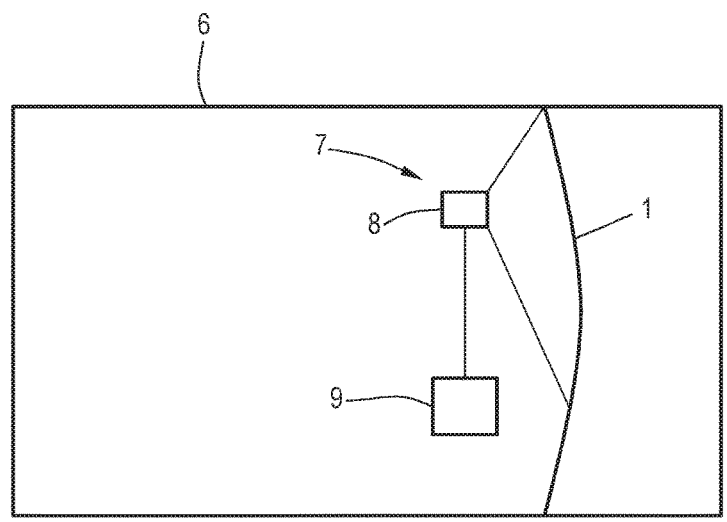
FIG. 4 illustrates a schematic representation of a motor vehicle according to the invention.

Further advantages and details of the present invention will become apparent from the embodiments described below and with reference to the drawings, wherein:

FIG. 1 shows a flow chart of a first embodiment of the method according to the invention, FIG. 2 shows a flowchart of a second embodiment of the method according to the invention, FIG. 3 shows a possibility for marking a selectable further road user, and FIG. 4 shows a motor vehicle according to the invention.

It should first be noted that the embodiments illustrated below relate to follow functions of a corresponding driver assistance system, which use a follow object as the evaluation object to be followed. In this case, quite a number of further follow functions may be available as part of the driver assistance system, of which one specific function can be selected as part of a third operating action prior to the selection of the evaluation object as a follow object, which is described in greater detail here.

FIG. 1 shows a flow chart of a first embodiment of the method according to the invention, which realizes a manual road user search (vehicle search). The method is started in a step S1 with the execution of a first operating action. Thereafter, in a step S2, the vehicle search is prepared. This breaks down into several sub-steps, which are not shown in greater detail.

In a first sub-step, environment data prepared as an environment model are preferably evaluated to determine which further road users are currently visible through the windshield of the motor vehicle, the same used as a projection screen of a head-up display as a display device. Ultimately, therefore, geometrical considerations are used to determine which further road users can be seen through the windshield, and thus through the projection surface.

In a further sub-step, which can also take place in parallel or before the first sub-step, basic operating parameters of the vehicle search are set. As such, in the present case, a length for which a selectable further road user is marked for selection is initially defined in a first time period. This is done according to the driving situation parameters which describe the driving situation, in such a manner that, in situations where further road users disappear quickly out of sight—that is, from the windshield—a first time period is selected, after which the selection must be made faster—and most commonly, less time is also available due to the driver being occupied by the driving process. In a traffic jam situation, however, significantly more time is available, such that longer first time periods can be selected. In the present case, a driving situation class and the speed of the ego-vehicle are selected as driving situation parameters.

However, driving situation parameters which are the result of a driving situation analysis are also used in another preparatory manner, namely in an adaptation of requirement criteria which will decide, in a further sub-step, whether a further road user is offered for selection at all, and/or how a certain further road user is marked. In this case, requirement criteria which exclude further road users from the selection are particularly adapted, wherein an attention parameter describing the driver's required attention is used as the driving situation parameter. The more attention the driving situation requires from the driver, the more the amount of selectable further road users is reduced—in this case by tightening the requirement criteria related to the selection.

In a further, subsequent sub-step, the further road users seen through the windscreen, which should be selectable later, are determined. For this purpose, certain requirement criteria are evaluated. Thus, for example when considering a follow mode more closely, a requirement criterion can relate to the direction of travel, or generally to the speed difference relative to the ego-vehicle, because, for example, further road users of oncoming traffic are out of the question as a follow object and can therefore be excluded. Other requirement criteria which can exclude further road users from suitability as an evaluation object—in this case, the follow object—deal with the driving style or the metrological detectability. During this process, which determines the group of selectable further road users, a suitability value is also already determined for each selectable further road user, which describes the degree and/or the extent of suitability of the further road user as an evaluation object. The suitability value in this case is expediently dependent on aspects such as the driving style of the further road user, the metrological detectability thereof, the driving situation relative to the ego-vehicle, and the like.

The suitability value is used in particular to determine the sequence in which the selectable further road users are offered for selection. The selectable further road user with the highest suitability is thereby preferably marked as the first to be selected, and then the next selectable further road users follow in decreasing order according to their suitability values. Thus, a sequence of the marking is now determined.

In a following step S3, the first selectable further road user in the sequence is marked. The marking, which is generated contact-analogically via the head-up display, is dependent on the suitability value in terms of color and geometric shape. Particularly suitable further road users are shown in green in this case, and a color scale transitioning to red is used for less-suitable further road users. At the same time, the symbol used for the marking, preferably comprising a crosshair, can have a geometric shape element of the display element for the suitability value—for example, a bar to be filled according to the suitability value or the like. Thus, the suitability, in addition to the selectable further road user, is also shown to the driver.

Since this is a manual road user search, a verification is made in step S4 as to whether during the first time period, after the start of the marking, a predetermined further operating action, preferably corresponding to the first operating action, occurs. If this is not the case, in a step S5, the currently selected further road user is selected as the evaluation object—in this case, the follow object—and the follow function is performed accordingly.

However, if the further operating action is detected in step S4, the operation continues again to step S3, and the next road user following in the sequence is marked. Once the sequence has been processed, it can start again from the beginning.

It should also be noted that the evaluation object remains marked by means of the display device, although in a distinctly different manner—for example, in a color which was not used during the selection process.

The embodiment of the method according to the invention shown in FIG. 2 differs from the embodiment shown in FIG. 1 only in step S4', and constitutes an automatic road user search. In this case, in step S4', a second time period is likewise used for a waiting period, and can be determined in the same manner as the first time period in step S2. If the time period expires without a predetermined second operating action having been performed, however, the selection should not be made. Rather, the process jumps to the next selectable further road user. In this case, the second operating action which is preferably different from the first operating action serves as the selection, such that the process continues, if the second action occurs within the second time period, to step S5, in which the currently marked selectable further road user is set as the evaluation object.

It should be noted for both embodiments that it has proved particularly useful, in terms of follow functions, to use communication data of the automobile-to-automobile communication, or data derived therefrom, as road user information which is evaluated by the requirement criteria—in particular, as far as the coming route of the further road user, and/or the destination thereof, and optionally an intermediate destination, are concerned. This is because it is useful for the suitability as a follow object to know whether the further road user has selected, at least for a minimum distance, the same route as the first vehicle, or even has the same destination. For example, further road users which do not travel the same route over the minimum distance can be excluded, while the duration of the shared route can be incorporated into the suitability value. The ideal situation is, of course, the same final destination.

FIG. 3 schematically shows a view through the windshield 1 of a motor vehicle, which is used as a projection surface of the display device. Three further road users 2, 3, 4 can be seen, wherein a cross-hair 5 is used as a symbol for marking the selectable further road user 4 by means of the projector of the head-up display.

FIG. 4 shows a basic sketch of a motor vehicle 6 according to the invention. The complete display device 7, with the windshield 1 and the projection unit 8, is shown here; the display device 7 is thus designed as a head-up display.

Also shown is a control device 9, which is designed in this case as a central control device 9 which is functionally assigned to all driver assistance systems. It collects environment data, including sensor data from environment sensors, communication data and the like, as well as ego-data of the ego-vehicle 6, which describe the operating state thereof, to generate an environment model through information fusion, said model providing the necessary input data to the functions of the driver assistance system. Also, the functions of the driver assistance systems themselves can be realized via the control device 9. In particular, the control device 9 is also designed to carry out the method according to the invention, wherein it is possible in particular, by appropriate settings, to activate the manual or automatic road user search.

The invention claimed is:

1. A method for selecting, by a driver of a motor vehicle, a road user using at least one display device which is configured to display the road user, the method comprising:
after a first operating action is carried out, activating a search function such that at least a subset of road users is individually marked on the at least one display device in a sequence that contains the road users; and when a second operating action is carried out, or after a predetermined first time period, selecting, from the subset of road users, an individually marked road user as an evaluation object of a function of a driver assistance system of the motor vehicle.

2. The method according to claim 1, further comprising:
automatically marking a next road user in response to the second operating action not being performed within a second time period.

3. The method according to claim 2, further comprising:
adjusting the predetermined first time period or the second time period based at least on a driving situation parameter describing a current driving situation.

4. The method according to claim 3, further comprising:
selecting a value for the predetermined first time period or the second time period based on a current speed of the motor vehicle or a current driving situation class.

5. The method according to claim 1, further comprising:
determining the road users based on at least one requirement criterion that is used for evaluating road user information related to a respective road user; or
varying a type of marking based on the at least one requirement criterion or an other requirement criterion.

6. The method according to claim 5, wherein the at least one requirement criterion is adjustable by the user.

7. The method according to claim 5, wherein:
the at least one requirement criterion describes suitability as the evaluation object, the suitability relates to metrological detectability of the respective road user or a driving style of the respective road user, or
the at least one requirement criterion is based on results of a driving situation analysis.

8. The method according to claim 5, further comprising:
determining the road user information, at least partially, from communication data of automobile-to-automobile communication.

9. The method according to claim 8, further comprising:
verifying whether a next route segment, having a minimum length, is shared by the respective road user and the motor vehicle or whether a common destination exists for the respective road user and the motor vehicle.

10. The method according to claim 5, further comprising:
varying a color or a geometric shape of a symbol which marks the individually marked road user.

11. The method according to claim 10, further comprising:
selecting a sequence of markings of the road users based on the at least one requirement criterion.

12. The method according to claim 11, further comprising:
determining a suitability value which describes a degree of suitability as the evaluation object, wherein the suitability relates to metrological detectability of the road user or a driving style of the respective road user; and
continuously depicting the suitability value by a color or a geometric shape of the symbol; or
determining the sequence of the markings based on the suitability value.

13. The method according to claim 5, further comprising:
adjusting the at least one requirement criterion based on a driving situation parameter describing a driving situation such that a number of the road users is reduced when the driving situation involves increased driver attention.

14. The method according to claim 1, further comprising:
selecting one of a plurality of possible functions based on a third operating action preceding the first operating action.

15. The method according to claim 1, further comprising:
after selecting the evaluation object, marking the selected evaluation object in a different manner on the at least one display device.

16. The method according to claim 1, further comprising:
using a head-up display device, which uses a windshield of the motor vehicle through which the road users are seen, as the at least one display device.

17. The method according to claim 1, further comprising:
using at least one follow function as the function, wherein the evaluation object is a follow object.

18. The method according to claim 1, wherein a marking used to mark the at least the subset of road users comprises a crosshair.

19. A motor vehicle, comprising: at least one display device; and a control device configured to select a road user, based on a selection of a driver, using the at least one display device which is configured to display the road user, by: after a first operating action is carried out, activating a search function such that at least a subset of road users is individually marked on the at least one display device in a sequence containing the road users; and when a second operating action is carried out, or after a predetermined first time period, selecting, from the subset of road users, an individually marked road user as an evaluation object of a function of a driver assistance system of the motor vehicle.

* * * * *